United States Patent Office 3,396,080
Patented Aug. 6, 1968

3,396,080
TUNGSTEN-RHENIUM COATED CERAMIC
REACTOR FUEL PARTICLES
Charles E. Hamrin, Jr., Oak Ridge, Tenn., assignor to the
United States of America as represented by the United
States Atomic Energy Commission
No Drawing. Original application Oct. 22, 1965, Ser. No.
502,690, now Patent No. 3,343,979, dated Sept. 26,
1967. Divided and this application Apr. 19, 1967, Ser.
No. 656,965
2 Claims. (Cl. 176—67)

ABSTRACT OF THE DISCLOSURE

Spherical ceramic nuclear reactor fuel particles are provided with a uniform bonded coating of tungsten-rhenium metal alloy.

---

The present invention relates to thermo-chemical reduction processes and more particularly to a novel method for co-depositing a tungsten-rhenium alloy by such techniques and to articles thereof.

This application is a division of my prior application, Ser. No. 502,690, filed Oct. 22, 1965 now Patent No. 3,343,979.

Heretofore, numerous metals have been deposited on supports or mandrels by well known techniques of vapor phase deposition. Generally, such methods consisted of thermally decomposing suitable compounds of the selected metal, which are usually in the form of a volatile metal halide, onto a heated object. Hydrogen reduction of a volatile metal halide has also been used to deposit metals. While such techniques have found widespread usage in preparing metals in different shapes and sizes, these techniques have generally, been ineffectual when applied to co-deposition processes. Such difficulty stems, mainly, from the different rates of deposition and the fact that at temperatures at which one metal deposits at high efficiency other metals which would be of interest as allowing agents deposit at very low efficiencies. Moreover, these problems are compounded where, as for example in the field of preparing refractory metal coated nuclear fuel particles, the coating must not only have uniform consistency but also must be deposited so as to form uniform coatings.

An object is to prepare reactor fuel particles having a uniform coating of tungsten-rhenium alloy of controlled composition.

A further object is to prepare dense spherical uranium dioxide particles coated with a 21% Re=79% W refractory metal alloy, said coating being characterized by its uniform thickness and homogenity of constituents.

In accordance with this invention, applicant has deposited a tungsten-rhenium metal alloy of controlled composition consisting, for example, of 21% rhenium-79% tungsten onto spherical uranium dioxide particles. Coatings deposited in accordance with the hereinafter described process parameters were found to be of uniform homogenity of constituents, essentially dense (>99% of theoretical density), and of uniform coating thickness. Leach studies (resulting in losses less than about 3%) indicated only a small portion of the particles had inferior coatings.

It has been found that the article of the present invention may ideally be prepared in a fluidized bed reactor. The design and operation of fluidized bed reactors which may be employed in carrying out this process are well known to those skilled in the art and need not be explained in greater detail than that given herein to provide an adequate explanation of the present invention.

In carrying out the invention spherical uranium dioxide particles are charged into a fluidized bed reactor. It should be apparent that the prior history, i.e., particular fabricational method, of the substrate forms no part of this invention and may be prepared by any conventional technique. Those skilled in the art will appreciate that while the size range of particles employed in fluidized bed coating operations may vary over a wide range, spherical particles having an average particle size of between 210 and 500 microns are especially suited for such coating operations.

As an initial step of the process, the reactor bed is first purged by passing an inert gas, such as argon, through the bed particles and during this purging phase the reactor and its charge are heated to about 450 °C. While in a fluidized state, hydrogen gas is then passed upward through the charge.

To initiate the coating operation a gaseous reaction mixture of tungsten hexafluoride and rhenium hexafluoride is passed simultaneously into the reactor through a common inlet in the bottom of the reactor vessel and isolated from hydrogen prior to contacting the particles. For this separate metered flow rates of tungsten hexafluoride and rhenium hexafluoride are admitted simultaneously through the common inlet. Since rhenium hexafluoride is a liquid at room temperature (boiling point 33.8° C.) and undergoes reaction with moisture or oxygen, transfer of the rhenium hexafluoride gas from a source supply to the mixing point prior to entry into the fluidized bed presents handling problems. These may be overcome by bubbling helium through a container containing liquid rhenium hexafluoride which is maintained at a controlled temperature such as 25° C.

It has been found that in the present co-deposition process a stoichiometric ratio of rhenium and tungsten (such as 1–3 where for example a 25% Re=75% W alloy is desired) cannot be employed to obtain a corresponding ratio of rhenium and tungsten in the alloy deposited. This is generally believed attributable to the fact that rhenium hexafluoride, at a given temperature, undergoes more complete conversion by hydrogen reduction than does tungsten hexafluoride. Deposition flow rates ($WF_6:ReF_6$) of about 1 to 7 have been suitable and are preferred. With respect to the gaseous reaction mixture, applicant has found that a stoichiometric excess of hydrogen should be employed as a diluent.

The temperature at which the co-deposition process is conducted is critical. Deposition rates of rhenium and tungsten metal are controlled by the temperature within the fluidized bed and have been found, where deposited separately, to generally increase as the deposition temperature increases above about 400° C. Deposition rates were found to be quite low below about 400° C. and unsatisfactory. While it would appear that the present invention should be carried out at higher temperatures due to the increased deposition rates, applicants have found that vapor deposited rhenium metal when laid down at the higher rates, i.e., at higher temperatures, is of a nodular character and undesirable because of nonuniformity of the coating thickness and inclusions of voids in the coating. On the other hand, while deposition rates of the tungsten hexafluoride favor higher temperatures, tungsten metal deposited at temperatures between 400° and 550° C. has been found to be of high quality. Accordingly, temperatures between 400°–500° C. are required for providing a uniform co-deposition from rhenium hexafluoride and tungsten hexafluoride.

The coating time is not citrical. It should be apparent that as the coating time increases the coating thickness increases, and it would naturally follow that the coating time would be varied depending upon the coating thickness desired. For example, spheroids having a coating thickness of 29 microns have been prepared in 2 hours at 450° C.

Further illustration of the quantitative aspects and procedures of the present invention is provided in the following example:

EXAMPLE

A fluidized bed reactor consisting of a 1⅜" ID stainless steel reaction chamber having a wire mesh bed support at the bottom was used for co-deposition of tungsten-rhenium alloys onto $UO_2$ particles. The reaction chamber was contained within an outer 2" nickel pipe which was in turn disposed within a resistance furnace. Sources of hydrogen and argon were connected through a common gas line to the bottom of the nickel pipe for initial purging and fluidizing the $UO_2$ charge. Separate rhenium hexafluoride and tungsten hexafluoride gas flows were metered and passed through a common line into the bottom of the reaction chamber, with the end of the common line terminating immediately below the wire mesh screen. The common gas line external to the reaction chamber was heated by a heating coil to preclude plugging of the line by liquefaction of the rhenium hexafluoride.

While tungsten hexafluoride could be transferred at room temperature, special precautions were taken with the transfer of rhenium hexafluoride to insure against reaction with moisture and air and liquefaction of the gas during transfer to the reaction chamber. The rhenium hexafluoride gas flow rate was provided by bubbling helium gas through a container of liquid rhenium hexafluoride which was maintained at a controlled temperature of about 25° C. The quantity of rhenium hexafluoride transferred by the helium carrier gas into the reaction chamber was thus indirectly controlled by directly controlling the flow of helium through the liquid rhenium hexafluoride.

Deposition temperatures were monitored by a thermocouple which was disposed within the reaction chamber submerged in the $UO_2$ charge.

To determine the effect of deposition variables of temperature and gas flow rates, separate runs were made as follows: Various weight charges of $UO_2$ particles (105–595 microns) were suspended in the reaction chamber for the separate runs. The reactor was then purged with argon flow (12 s.l.p.m.) while bringing the reactor and its charge to deposition temperature, and then hydrogen flow was initiated.

At this point co-deposition of rhenium-tungsten alloy was commenced by the simultaneous introduction of a gaseous reaction mixture of tungsten hexafluoride and rhenium hexafluoride at the bottom of the reaction chamber. This phase was contained for 1¼ to 3 hours which produced coating thicknesses of 16 to 48 microns on the $UO_2$ particles.

The resulting rhenium-tungsten coated $UO_2$ particles were removed from the reaction chamber and examined. Photomicrographs of the coated particles indicated that the particles were free of voids and of uniform coating. The rhenium-tungsten alloy coatings appear columnar when viewed under polarized light. Chemical analysis of the resulting coated particles was effected by cinchonine precipitation and ignition to the oxide for tungsten and triphenylarsonium chloride precipitation for rhenium and the coating composition determined for each run. The results are given in the table below.

TABLE

| | | Charge | | Gas Composition | | | | | Coating | | | Plating Eff. Percent | |
|---|---|---|---|---|---|---|---|---|---|---|---|---|---|
| | Temp., °C. | Weight, Grams | Size, μ | $H_2$ | Inert | $WF_6$ | $ReF_6$ | $WF_6/ReF_6$ ratio | Rate, μ/hr. | Re, w./o.* | Thickness, μ | $WF_6$ | $ReF_6$ |
| Run: | | | | | | | | | | | | | |
| 1 | 390 | 51.3 | 105–125 | 96.8 | 2.6 | 0.55 | 0.065 | 1:8.5 | 8.4 | 41.7 | 25.3 | 6.9 | 42.4 |
| 2 | 440 | 118.3 | 250–297 | 75.4 | 23.6 | 0.66 | 0.41 | 1:1.6 | 17.3 | 52.7 | 25.9 | 55.3 | 97.4 |
| 3 | 450 | 56.0 | 210–500 | 60.8 | 38.8 | 0.36 | 0.049 | 1:7.4 | 14.3 | 31.1 | 28.6 | 30.3 | 97.7 |
| 4 | 550 | 48.4 | 210–500 | 60.8 | 38.8 | 0.36 | 0.047 | 1:7.7 | 17.9 | 21.4 | 35.8 | 52.7 | 106.7 |
| 5 | 550 | 49.0 | 210–500 | 60.8 | 38.8 | 0.35 | 0.031 | 1:11.5 | 18.6 | 18.5 | 37.1 | 24.5 | 61.6 |
| 6 | 650 | 49.4 | 210–500 | 60.8 | 38.8 | 0.36 | 0.043 | 1:8.4 | 24.0 | 7.6 | 47.9 | 63.9 | 43.3 |
| 7 | 750 | 46.9 | 210–595 | 60.8 | 38.8 | 0.32 | 0.043 | 1:7.5 | 13.3 | 23.4 | 26.5 | 16.0 | 36.4 |

*Rhenium in coating.

At low temperatures such as 390° C. the low plating efficiency of $WF_6$ (6.9%) and $ReF_6$ (42.4%) makes the deposition process unattractive. At 750° C. in addition to the low efficiencies, the coating was nonuniform and contained voids. Runs 2–5 produced high quality coatings and show the effect of the $WF_6/ReF_6$ ratio at 440–450° C. and at 550° C. on the rhenium content of the coating. At 650° C. (Run 6) the decrease in $ReF_6$ efficiency, at a $WF_6/ReF_6$ ratio which produced good results at 440°–550° C., renders this temperature uneconomical.

What is claimed is:

1. Spherical ceramic nuclear fuel reactor particles having a uniform bonded coating of tungsten-rhenium metal alloy.

2. The article of claim 1 wherein said fuel particle comprises 210–500 micron $UO_2$ and said coating comprises by weight percent 21% rhenium and 79% tungsten.

References Cited

UNITED STATES PATENTS 3,088,892    5/1963    Cain et al. _____ 176—91 X

OTHER REFERENCES

Nuclear Science Abstracts, vol. 18, No. 20, Oct. 31, 1964, Abstract #36,228.

CARL D. QUARFORTH, *Primary Examiner.*

M. J. SCOLNICK, *Assistant Examiner.*